United States Patent
Kim (10) Patent No.: US 8,398,468 B2
(45) Date of Patent: Mar. 19, 2013

(54) AIR CONDITIONING DEVICE FOR CAR

(75) Inventor: Sung Il Kim, Chungcheongnam-do (KR)

(73) Assignee: Modine Korea, LLC, Chungheongnam-Do (KR)

( * ) Notice: Subject to any disclaimer, the term of this patent is extended or adjusted under 35 U.S.C. 154(b) by 1013 days.

(21) Appl. No.: 12/359,489

(22) Filed: Jan. 26, 2009

(65) Prior Publication Data

US 2009/0264061 A1 Oct. 22, 2009

(30) Foreign Application Priority Data

Apr. 17, 2008 (KR) .................. 10-2008-0035731

(51) Int. Cl.
B60H 1/26 (2006.01)
(52) U.S. Cl. ...................................... 454/143
(58) Field of Classification Search .......... 454/121–165, 454/252, 143; 16/366, 368, 386; 403/78, 403/164, 165, 371, 365; 464/182
See application file for complete search history.

(56) References Cited

U.S. PATENT DOCUMENTS

| | | | |
|---|---|---|---|
| 5,399,120 A * | 3/1995 | Burns et al. | 454/126 |
| 5,647,399 A | 7/1997 | Andersen | |
| 6,113,483 A * | 9/2000 | Schambre et al. | 454/121 |
| 6,416,404 B2 * | 7/2002 | Ozeki | 454/156 |
| 6,695,691 B1 * | 2/2004 | Le | 454/156 |
| 7,563,159 B2 * | 7/2009 | Newman et al. | 454/156 |
| 2007/0077879 A1 * | 4/2007 | Marshall et al. | 454/121 |
| 2007/0293135 A1 * | 12/2007 | Hori et al. | 454/121 |
| 2009/0068939 A1 * | 3/2009 | Onda et al. | 454/152 |

FOREIGN PATENT DOCUMENTS

| | | |
|---|---|---|
| DE | 7 240 195 U | 2/1973 |
| DE | 100 38 944 A1 | 8/2001 |
| EP | 1 832 450 A1 | 12/2007 |
| JP | 10 244 822 A | 9/1998 |

* cited by examiner

Primary Examiner — Steven B McAllister
Assistant Examiner — Jamil Decker
(74) Attorney, Agent, or Firm — Law Offices of Robert F. Zielinski, LLC (57) ABSTRACT

An air conditioning device for a car includes a door structure composed of an inner door and an outer door having an inner space in which the inner door rotates, and the circumference of which comes into facial contact with the inner door, wherein the facial contact prevents air from leaking, and the inner and outer doors respectively control the temperature and amount of air to flow.

9 Claims, 13 Drawing Sheets

AIR CONDITIONING DEVICE FOR CAR

CLAIM OF PRIORITY

This application claims the benefit of Korean Patent Application No. 10-2008-35731 filed on Apr. 17, 2008, in the Korean Intellectual Property Office, the disclosure of which is incorporated herein by reference.

BACKGROUND OF THE INVENTION

1. Field of the Invention

The present invention relates, in general, to an air conditioning device for a car, a foot-door of which is of a double structure.

2. Description of the Related Art

Figure 1:
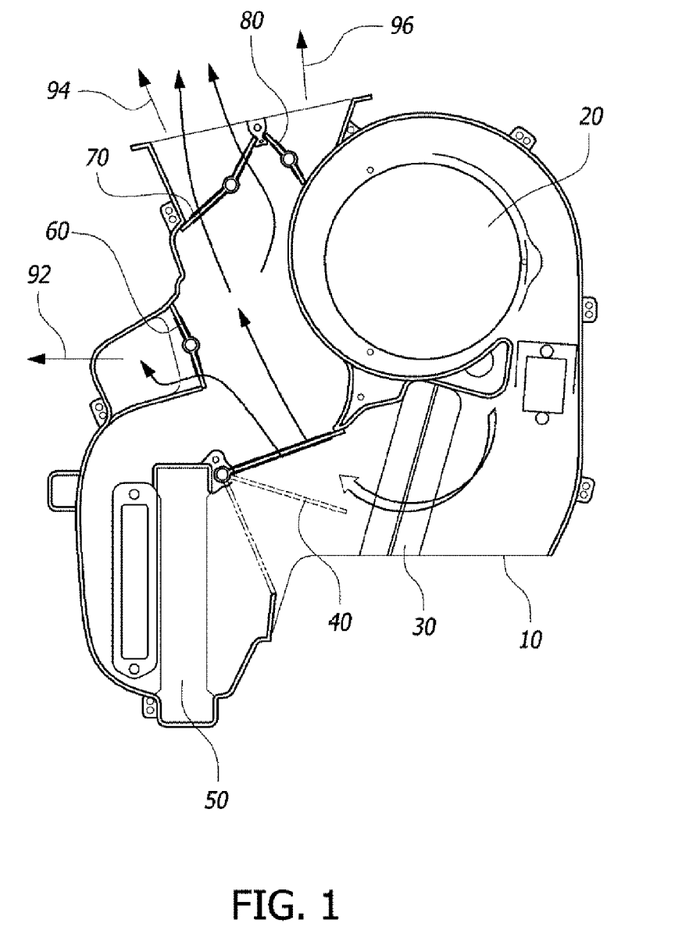
FIG. 1 is a cross-sectional view illustrating an air conditioning device according to the prior art.
Figure 2:
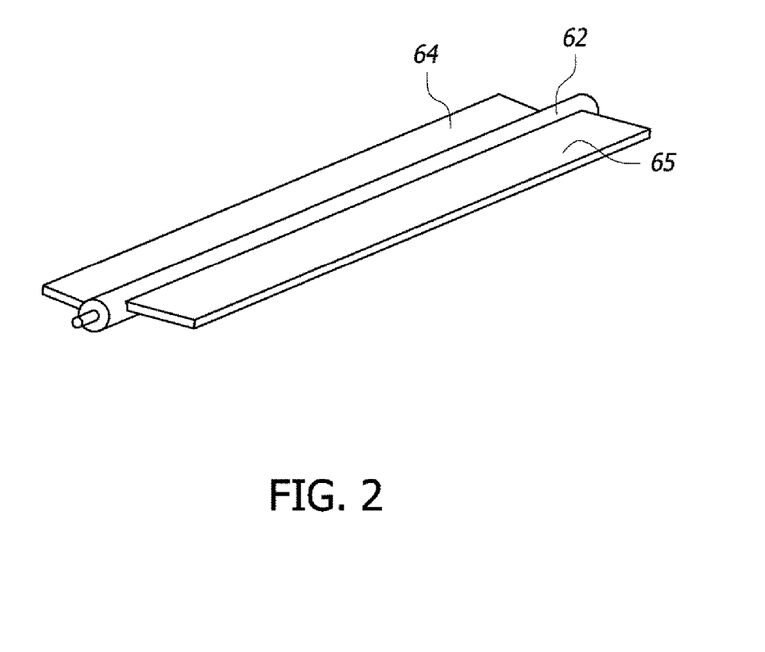
FIG. 2 is a perspective view illustrating a door of the air conditioning device of FIG. 1.
Figure 3:
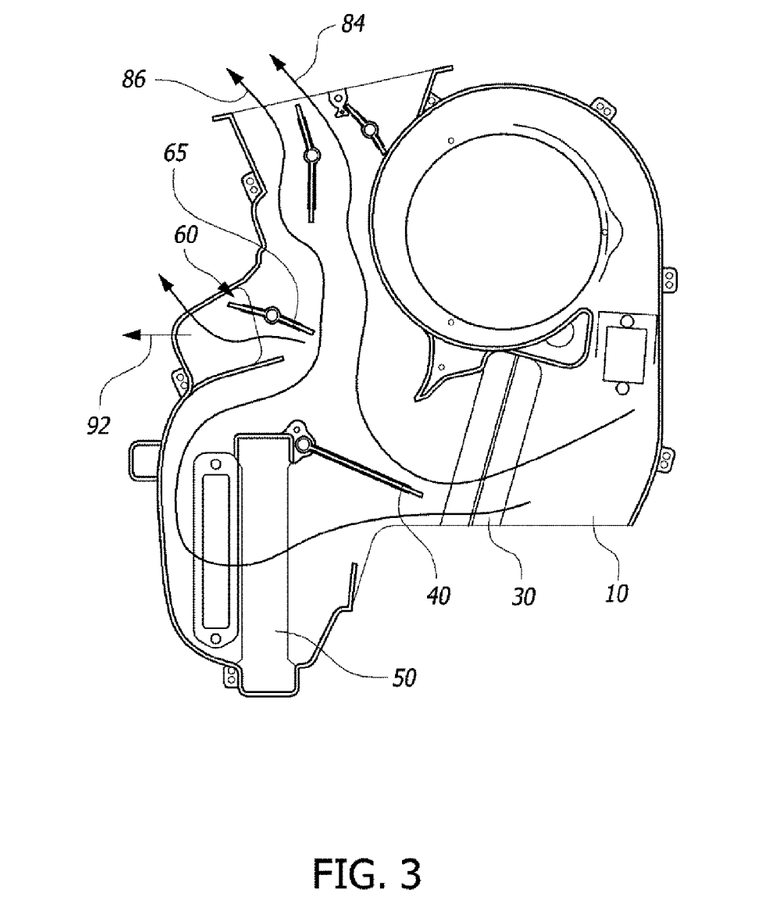
FIG. 3 is a cross-sectional view illustrating the air conditioning device of FIG. 1 in which the door is open in foot and vent directions.
Figure 4:
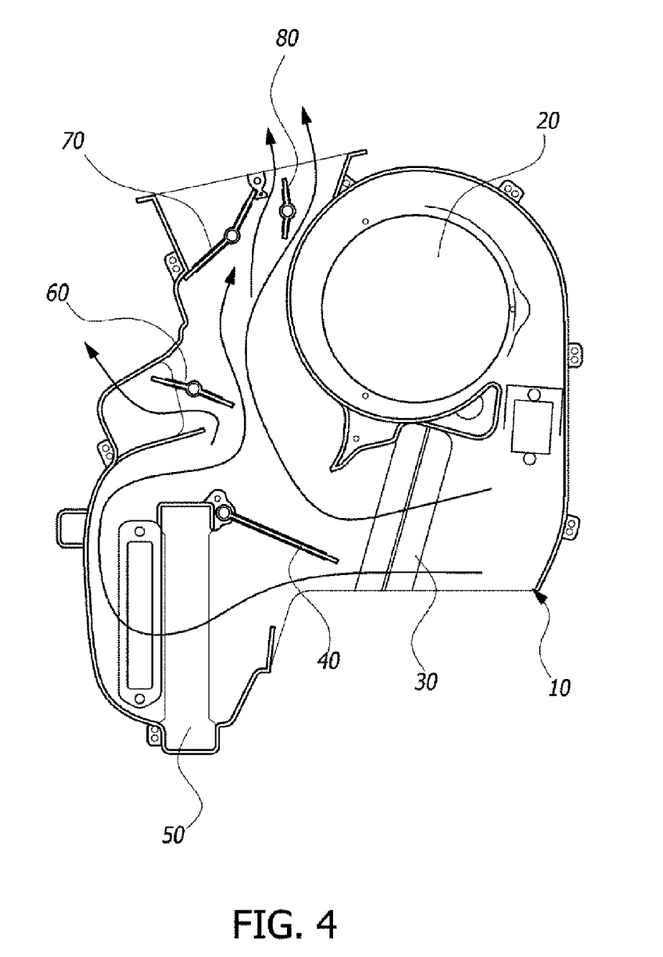
FIG. 4 a cross-sectional view illustrating the air conditioning device of FIG. 1 in which the door is open in foot and defrost directions.

FIG. 1 is a cross-sectional view illustrating an air conditioning device of the prior art, FIG. 2 is a perspective view illustrating a door of the air conditioning device of FIG. 1, FIG. 3 is a cross-sectional view illustrating the air conditioning device of FIG. 1 in which the door is open in foot and vent directions, and FIG. 4 a cross-sectional view illustrating the air conditioning device of FIG. 1 in which the door is open in foot and defrost directions.

In FIG. 1, the air conditioning device includes a case 10 in which air conditioning is carried out, an air inlet 20 provided in the case 10, and an evaporator 30 provided below the air inlet 20.

The air inlet 20 serves to direct air introduced therethrough to the evaporator 30, which in turn serves to cool the temperature of air introduced therein.

In addition, a temperature-control door 40 is provided in front of the evaporator 30, a heater core 50 is provided in front of the temperature-control door 40, and a foot-door 60, a vent-door 70, and a defrost door 80 are provided above the heater core 50.

In accordance with an installing position or a structural feature of an air conditioning device in a car, the foot-door 60 is placed on a side face of the case 10 relatively vertical to the ground when in a closed state, and the vent-door 70 and the defrost-door 80 are on the case 10 relatively horizontal to the ground when in a closed state.

The temperature-control door 40 is placed between the evaporator 30 and the heater core 50 such that, when in a cooling mode, it rotates downwards to cut off an inflow of air into the heater core 50, and, when in a heating mode, it rotates upwards to cut off an air path so as to allow air to flow in the heater core 50, and further, when in a mixing mode, it is placed between the former positions to induce cool air and warm air to be mixed.

Thus, depending upon the position of the temperature-control door 40, an air conditioning mode is selected from the cooling mode, the heating mode, and the mixing mode.

That is, when the temperature-control door 40 rotates to the positions depicted in solid line, dashed dotted line, and dotted line, it is in the heating mode, the cooling mode, and the mixing mode, respectively.

Here, in the mixing mode, a portion of cool air, which is heat-exchanged while passing through the evaporator 30, passes through the heater core 50, and remaining portion passes through the air path without passing through the heater core 50, so that warm air heat-exchanged while passing through the heater core 50, and cool air not passing through the heater core 50, are mixed together in a mixing space MS provided above the evaporator 30 and the heater core 50, and the mixed air is discharged out into a room.

The foot-door 60 is configured such that opposite blades 64 and 65 are provided about a center axis 62 as shown in FIG. 2. The configurations of the vent-door 70 and the defrost door 80 are identical to that of the foot-door.

The operation of the conventional air conditioning device will now be described as follows.

If it is required to control the temperature or the quantity of air in a car, a driver touches a control button to operate an air conditioning device.

Here, air flows out in a foot direction 92, a vent direction 94, or a defrost direction 96. The driver can selectively set a direction of air to any one of foot direction 92, vent direction 94, and defrost direction 96, or otherwise either to both foot direction 92 and vent direction 94 or to both foot direction 92 and defrost direction 96 at the same time.

In these cases, when it is set that air flows in both foot direction 92 and vent direction 94 at the same time, such that high temperature air flows towards the foot direction 92 and low temperature air flows towards the vent direction 94, the air conditioning device operates as shown in FIG. 3.

That is, as shown in FIG. 3, the temperature-control door 40 is positioned in the mixing mode so that a portion of air flowing from the evaporator 30 flows upwards along a right sidewall in a first direction 84, and the remaining portion passes through the heater core 50 and flows upwards along a left sidewall in a second direction 86.

Herein, since an inlet of a path in the foot direction 92 is formed perpendicular to the first and second directions 84 and 86, air flowing in those directions does not easily flow in the path of the foot direction 92.

If the foot-door 60 opens at a certain angle from a closed position as shown in FIG. 1, a lower blade 65 of the foot-door 60 rotates counterclockwise at an angle between 45° and 90° towards the inside of the case 10, so that cool air rising along the first direction 84 and warm air rising along the second direction 86 are properly mixed together by the lower blade 65 of the foot-door 60 and flow in the foot direction 92.

However, since the opposite blades 64 and 65 of the foot-door 60 are of a single-plate structure, depending upon a rotation angle of the opposite blades 64 and 65, air flowing in the path in the foot direction 92 becomes greatly varied in its temperature and amount.

Thus, there is a problem in controlling the temperature and amount of air to flow.

Such a problem also occurs even when a driver operates the foot-door 60 and the defrost-door 80 at the same time.

SUMMARY OF THE INVENTION

Accordingly, the present invention has been made keeping in mind the above problems occurring in the related art, and the present invention is intended to propose an air conditioning device for a car in which the temperature and amount of air flowing through a foot-door are precisely controlled.

In order to achieve the above object, according to one aspect of the present invention, there is provided an air conditioning device for a car including a door structure composed of an inner door and an outer door having an inner space in which the inner door rotates, and the circumference of which comes into facial contact with the inner door, whereby the facial contact prevents air from leaking, and the inner and outer doors respectively control the temperature and amount of air to flow.

The door structure may be a foot-door in which the inner and outer doors respectively rotate only when air flows in both foot and vent directions or both foot and defrost directions.

The width of the inner door may be larger than the width b of the inner space having an extension space.

A first connector may include an inner hole to connect one end of both the inner and outer doors, the inner hole being defined by a first semi-circular section and an opposite second semi-circular section, which is concentric to the first section and a size of which is larger than that of the first section.

The inner door may be provided with a rotation axis having an end groove, and the inner hole is provided therein with a protrusion, which is inserted into the end groove.

The inner door may be provided with a rotation axis having a circumferential groove, and the outer door is provided with a circular receptacle having a circumferential protrusion fitted into the circumferential groove. The inner door may include upper and lower blades which are angled at below 180°, and a link is coupled to the inner door.

The inner and outer doors may be configured such that the inner door is rotated by a second link and a second lever, the second link being provided with a second coupling hole to which a first facetted face is coupled, and the outer door is rotated by a second connector, a first link, and a first lever, the second connector being provided with a fourth semi-circular section into which the circular receptacle of the outer door is inserted, so that the inner and outer doors rotate respectively.

According to the present invention, the air conditioning device for a car is configured such that the outer door firstly controls the temperature and amount of air flowing through the outer door towards the foot direction, and the inner door secondarily controls the temperature and amount of air flowing through the inner door towards the foot direction more precisely, thereby having an effect of precise control on the temperature and amount of air to flow.

Further, it is configured such that the vertical width of the inner door is larger than that of the inner space, the horizontal width of the inner door is the same as that between ends of the extension spaces of the inner space, the upper and lower blades of the inner door are angled at 180° or less, and upper and lower blades of the outer door are angled at the same angle as those of the inner door, so that, when the inner door is coupled onto the outer door with the foot-door closed, the inner door comes into facial contact with the circumference of the inner space, preventing any air leakage.

Further, the end groove and the protrusion have an effect on, when the inner door rotates while being coupled to the first connector, effectively preventing the rotation axis from vibrating in the inner hole of the first connector.

Further, the circumferential groove and the circumferential protrusion advantageously allow that upon rotation, the inner door having been coupled to the outer door does not move laterally.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts. In describing the present invention, if a detailed description on related known constructions or functions is determined to make the gist of the invention ambiguous, it will be omitted.

Figure 5:
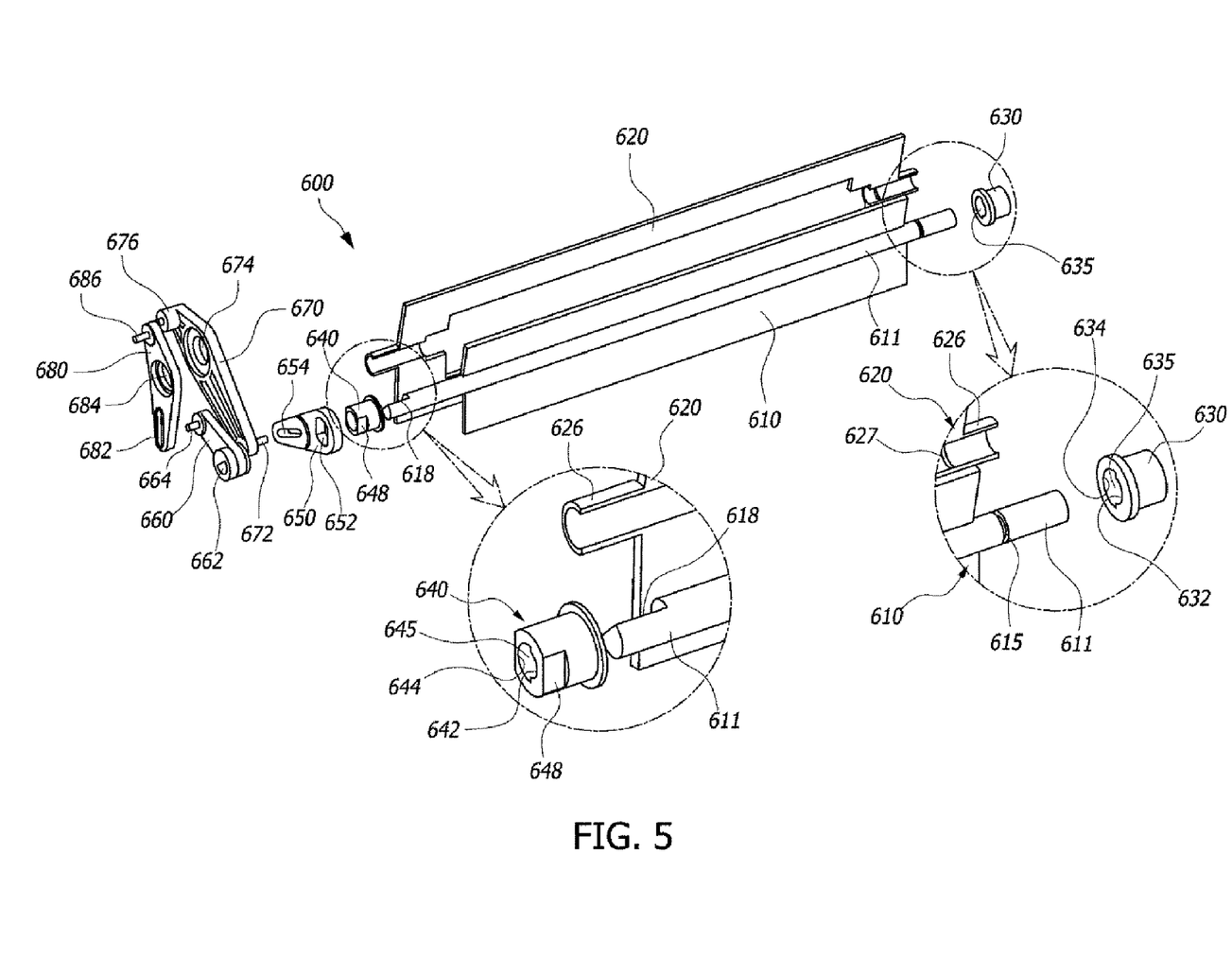
FIG. 5 is an exploded perspective view illustrating a foot-door of an air conditioning device according to the present invention.
Figure 6:
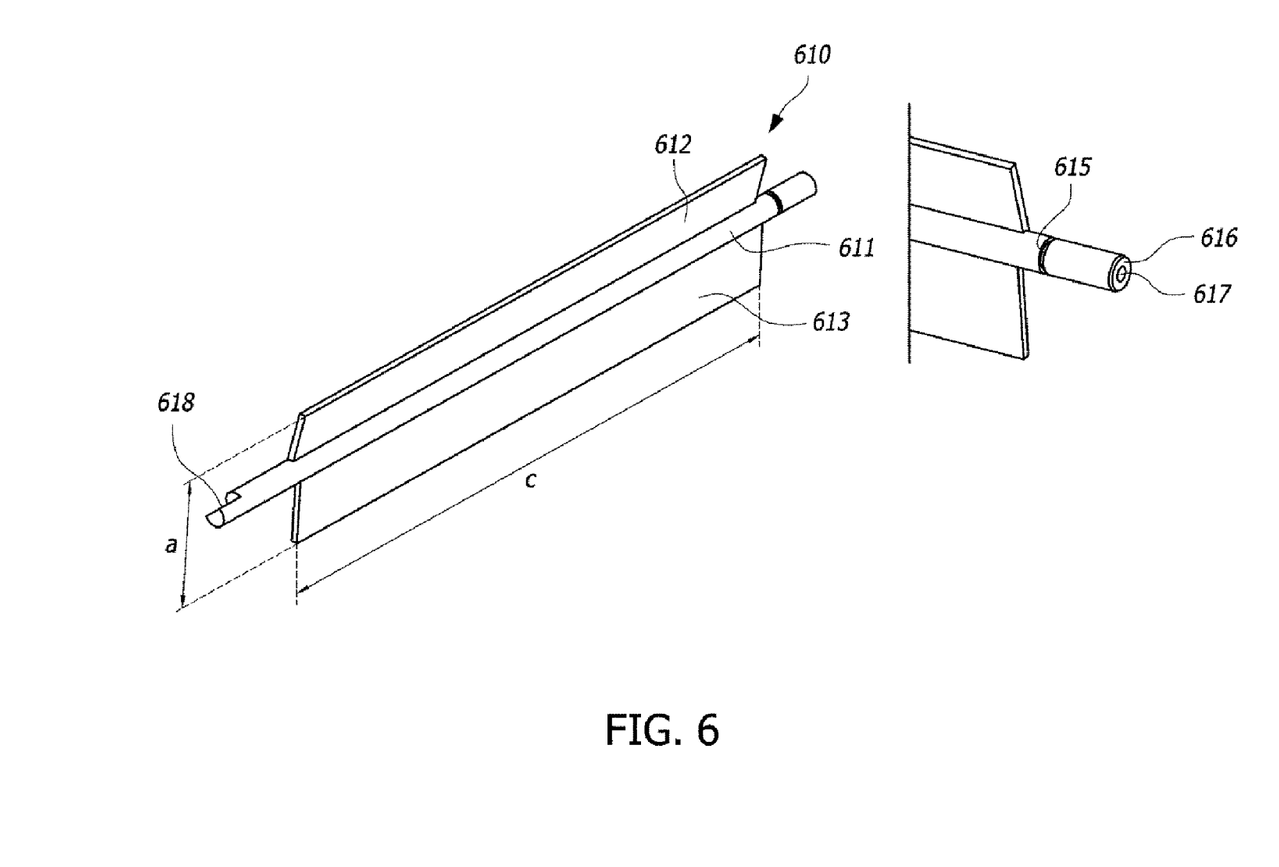
FIG. 6 is a perspective view illustrating an inner door of the air conditioning device of FIG. 5.
Figure 7:
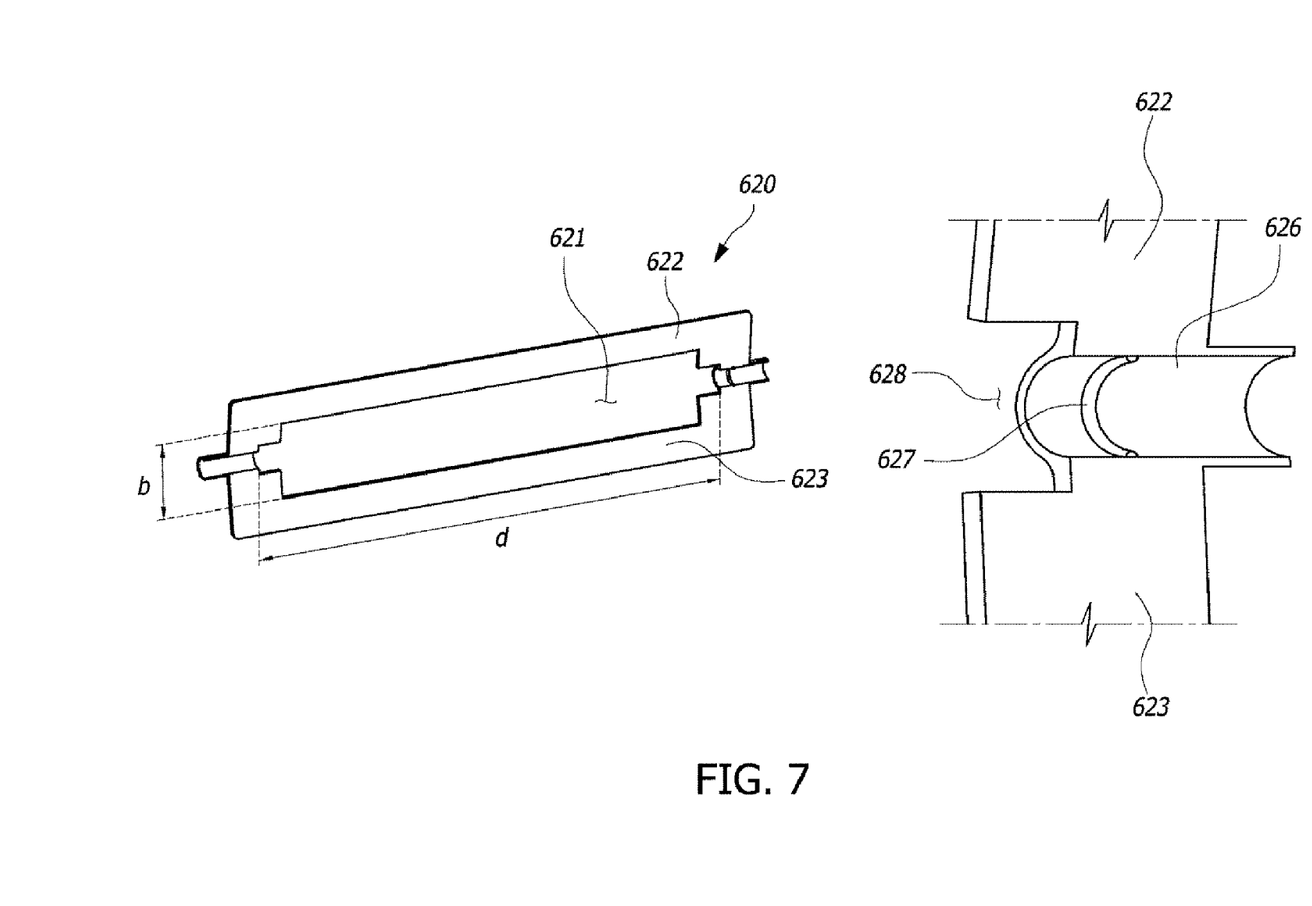
FIG. 7 is a perspective view illustrating an outer door of the air conditioning device of FIG. 5.
Figure 8:
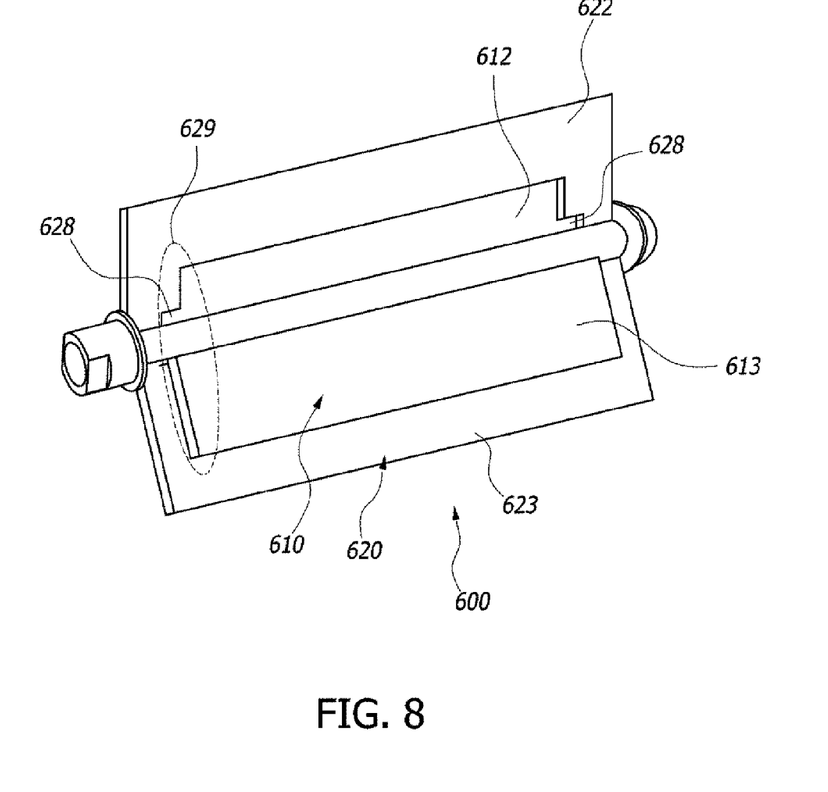
FIG. 8 is a perspective view illustrating the air conditioning device of FIG. 5 in which the inner and outer doors are coupled together.

FIG. 5 is an exploded perspective view illustrating a foot-door of an air conditioning device according to the present invention, FIG. 6 is a perspective view illustrating an inner door of the air conditioning device of FIG. 5, FIG. 7 is a perspective view illustrating an outer door of the air conditioning device of FIG. 5, and FIG. 8 is a perspective view illustrating the air conditioning device of FIG. 5 in which the inner and outer doors are coupled together.

The foot-door 600, as shown in FIG. 5, includes the inner door 610, the outer door 620 coming into facial contact with the circumference of the inner door 610, a first connector 630 connecting one end of the inner and outer doors 610 and 620, a second connector 640 connecting another end of both the inner and outer doors 610 and 620, a first link 650 connected to the second connector 640, and a second link 660 connected to the inner door 610 passing through the second connector 640.

The inner door 610, as shown in FIG. 6, has upper and lower blades 612 and 613 about a rotation axis 611, which is provided with a circumferential groove 615 on one side 616 having therein an end groove 617 and a first facetted face 618 on the other side.

As illustrated in FIG. 7, the outer door 620 upper and lower blades 622 and 623 with an inner space 612 provided therebetween, and a circular receptacle 626 is provided on a connection between the upper and lower blades 622 and 623.

The circular receptacle 626 is provided with a circumferential protrusion 627 which is fitted into the circumferential groove 615, and the inner space 621 has extension spaces 628 on both ends which extend into a portion of the upper and lower blades 622 and 623 towards the circular receptacle 626.

Meanwhile, in the state that the inner and outer doors 610 and 620 are coupled together, the circumferential groove 615 and the circumferential protrusion 627, which are engaged with each other, serve to prevent the inner door 610 from moving laterally upon rotation.

As illustrated in FIGS. 6 to 8, the vertical width a of the inner door 610 is larger than that the vertical width b of the inner space 621, and the horizontal width c of the inner door 610 is identical to the horizontal width d between the extension spaces 628, so that the inner door has a structure in which the lower blade 613 covers a lower portion of the inner space 621 at a front side, and the upper blade 612 is positioned at a rear side of the inner space 621 and is covered by the upper blade 622 of the outer door 620.

As illustrated in FIG. 8, the upper and lower blades 612 and 613 of the inner door are angled at an angle of below 180°, and the upper and lower blades 622 and 623 of the outer door are provided to have the same angle.

Thus, when the inner door 610 is coupled to the outer door 620 with the foot-door 600 closed, the inner door 610 comes into facial contact with the circumference of the inner space 621, preventing an air leakage.

If needed, the inner and outer doors may be configured such that the upper and lower blades 622 and 623 of the outer door, which are of the same thickness, are angled at 180°, being flush with each other, and the extended planes of the upper and lower blades 612 and 613 of the inner door 610 are spaced off by the thickness of the upper blade 622 of the outer door from each other, so that upon coupling of the inner door 610 to the outer door 620 with the foot-door 600 closed, the inner door 610 comes into facial contact with the circumference of the inner space 621.

The extension space 628, as illustrated in FIG. 8, is configured such that a contact portion 629 between the inner and outer doors 610 and 620 is brought into facial contact with the circumference of the extension space 628, so that upon closing of the foot-door 600, it serves to prevent air from leaking through the contact portion 629 between the inner and outer doors 610 and 620.

That is, when the foot-door 600 is in a closed state, the inner and outer doors 610 and 620 come into facial contact with each other, cutting off airflow.

Figure 9:
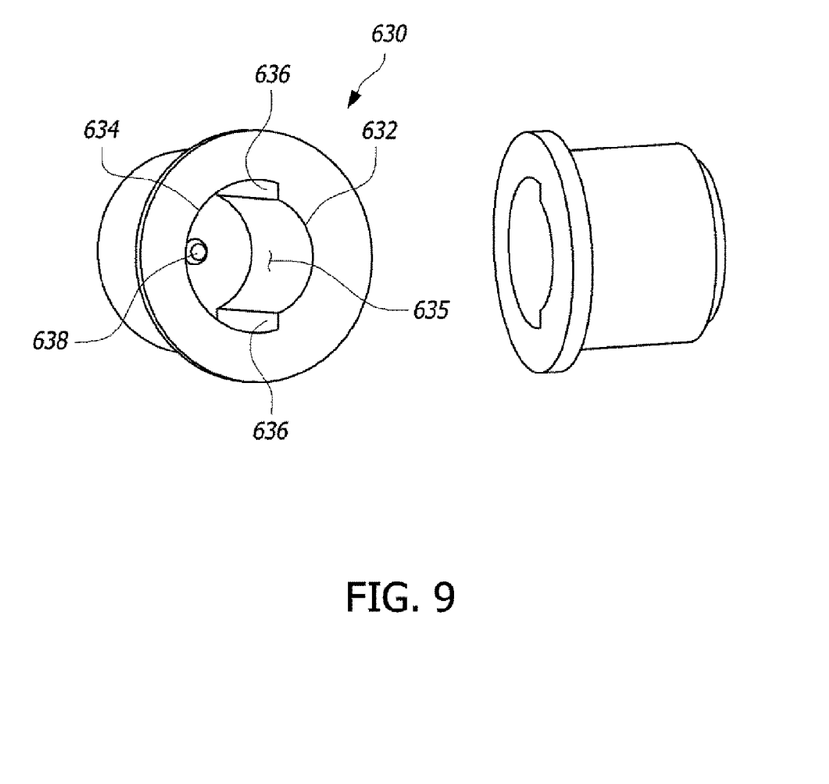
FIG. 9 is a perspective view illustrating a first connector of the air conditioning device of FIG. 5.
Figure 10:
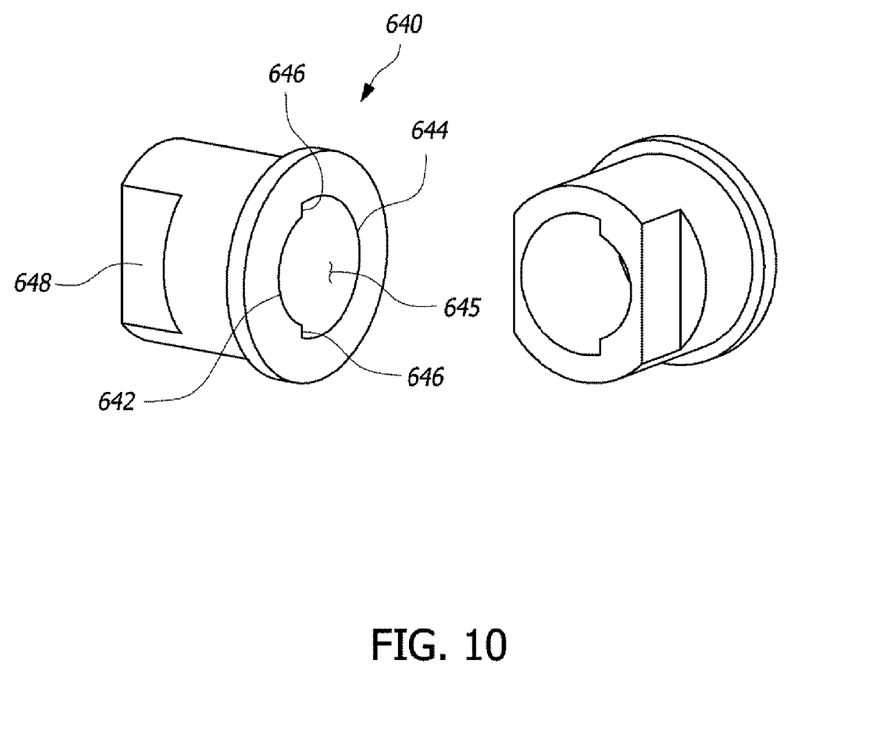
FIG. 10 is a perspective view illustrating a second connector of the air conditioning device of FIG. 5.
Figure 11:
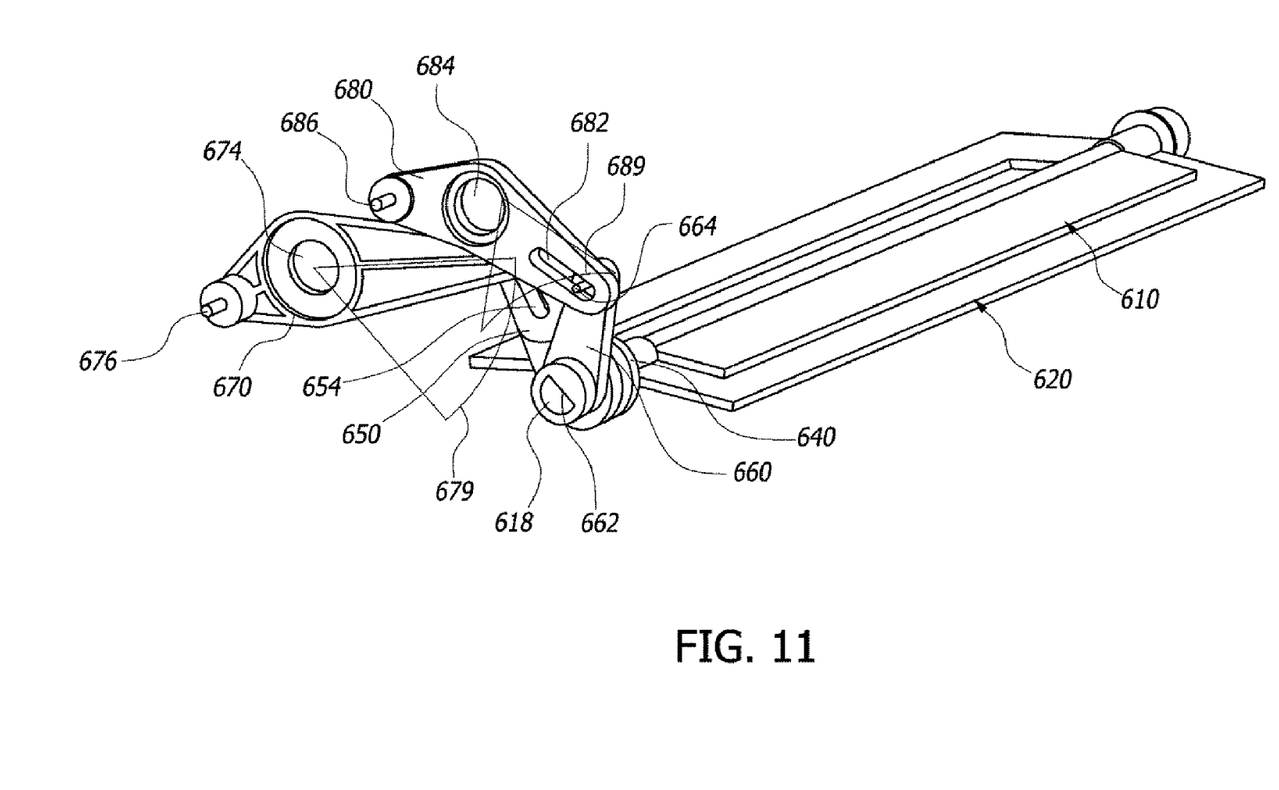
FIG. 11 is a perspective view illustrating assembly of the air conditioning device of FIG. 5.

FIG. 9 is a perspective view illustrating a first connector of the air conditioning device of FIG. 5, FIG. 10 is a perspective view illustrating a second connector of the air conditioning device of FIG. 5, and FIG. 11 is a perspective view illustrating assembly of the air conditioning device of FIG. 5.

In FIG. 9, the first connector 630 includes therein an inner hole 635, which is defined by a first semi-circular section 632 and a second semi-circular section 634 which is concentric to the first section 632 and a size of which is larger than the first section 632. A first step 636 is formed on a connection portion between the first and second sections 632 and 634. The inner hole 635 is provided therein with a protrusion 638, which is inserted into the end groove 617.

The end groove 617 of FIG. 6 and the protrusion 638 of FIG. 9 serve to prevent the rotation axis 611 of the inner door 610, which rotates while being coupled to the first connector 630 as shown in FIG. 5, from vibrating in the inner hole 635 of the first connector 630.

As illustrated in FIG. 5, the first semi-circular section 632 of the inner hole 635 receives therein the rotation axis 611, and the second semi-circular section 634 of the inner hole receives therein the circular receptacle 626.

If needed, the circumferential groove 615 and the circumferential protrusion 627 may change their positions oppositely, and the end groove 617 and the protrusion 638 may also do as well.

As illustrated in FIG. 10, the second connector 640 includes therein an inner hole 645, which is defined by a third semi-circular section 642 and a fourth semi-circular section 644 which is concentric to the third section 642 and is of a size that is larger than the third section 642. A second step 646 is formed on a connection portion between the third and fourth sections 642 and 644.

The third semi-circular section 642 of the inner hole 645 receives therein the rotation axis 611, and the fourth semi-circular section 644 of the inner hole receives therein the circular receptacle 626.

The second connector 640 is provided with a second facetted face 648 on the circumference of one side.

As illustrated in FIGS. 5 and 11, the first link 650 includes a first coupling hole 652 into which the second facetted face 648 of the second connector 640 is inserted, and a first slot 654 spaced apart from the first coupling hole 652.

A first lever 670 includes a first protrusion 672 which is inserted into the first slot 654, a first center hole 674 for rotation spaced apart from the first protrusion 672, and a first actuator-connector 676 spaced apart from the first center hole 674 for rotation.

Thus, when the first actuator-connector 676 is rotated about the first center hole 674 for rotation, the first protrusion 672 moves along a first path 679, shown in FIG. 11, in the first slot 654 to thereby rotate the second connector 640, resulting in rotating the outer door 620.

Further, the second link 660 includes a second coupling hole 662, in which the first facetted face 618 of the inner door 610 is inserted, and a second protrusion 664 spaced apart from the second coupling hole 662.

A second lever 680 includes a second slot 682, into which the second protrusion 664 is inserted, a second center hole 684 for rotation spaced apart from the second slot 682, and a second actuator-connector 686 spaced apart from the second center hole 684 for rotation.

Thus, when the second actuator-connector 686 is rotated about the second center hole 684 for rotation, the second protrusion 664 moves along a second path 689, shown in FIG. 11, in the second slot 682, so that the second link 660 rotates the inner door 610.

As such, since the inner door 610 is coupled with the second link 660 in such a way that the rotation axis 611 passes through the third semi-circular section 642 of the second connector 640 such that the first facetted face 618 is fitted into the coupling hole 662 of the second link 660, so that it is rotated by the second lever 680 coupled with the second link 660. In addition, since the outer door 620 is coupled with the first link 650 in such a way that the circular receptacle 626, a radius of which is larger than that of the rotation axis 611, is received in the fourth semi-circular section 644 of the second connector 640, a radius of which is larger than that of the third semi-circular section 642 such that the second facetted face 648 of the second connector 640 is fitted into the coupling hole 652 of the first link 650, so that it is rotated by the first lever 670 coupled with the first link 650.

Thus, the foot-door 600 is of a structure in which the inner and outer doors 610 and 620 respectively rotate.

Figure 12:
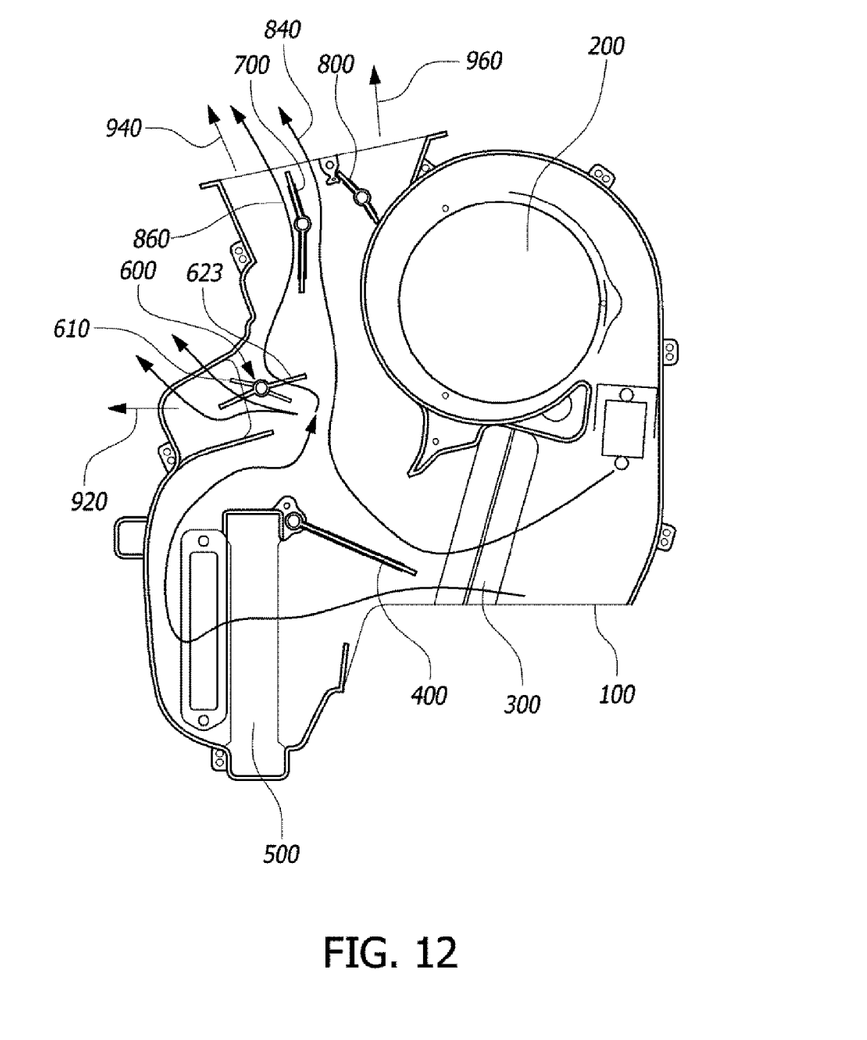
FIG. 12 is a cross-sectional view illustrating the air conditioning device of the present invention in which the door is open in both foot and vent directions.
Figure 13:
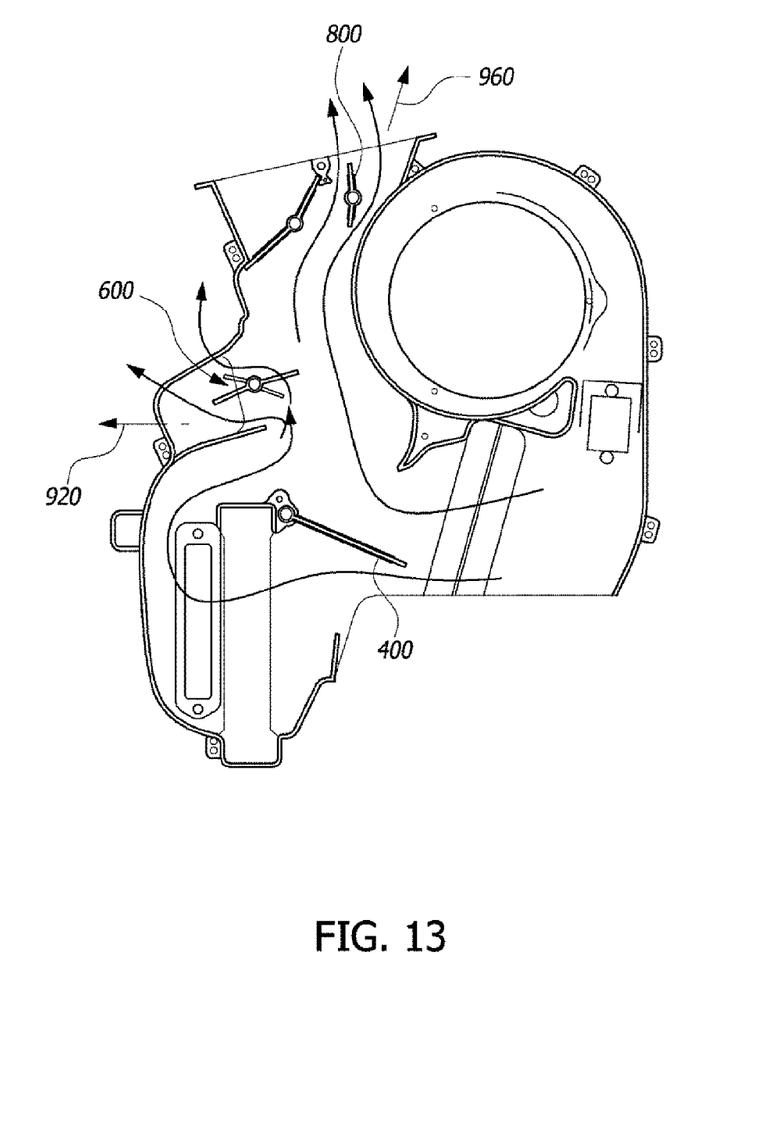
FIG. 13 is a cross-sectional view illustrating the air conditioning device of the present invention in which the door is open in both foot and defrost directions.

FIG. 12 is a cross-sectional view illustrating the air conditioning device of the present invention in which the door is open in foot and vent directions, and FIG. 13 a cross-sectional view illustrating the air conditioning device of the present invention in which the door is open in foot and defrost directions.

As illustrated in FIG. 12, the air conditioning device of the present invention includes a case 100 in which air conditioning is carried out, an air inlet 200 provided in the case 100, and an evaporator 300 provided below the air inlet 200.

The air inlet 200 serves to direct air introduced therethrough to the evaporator 300, which serves to in turn cool temperature of air introduced therein.

In addition, a temperature-control door 400 is provided in front of the evaporator 300, a heater core 500 is provided in front of the temperature-control door 400, and a foot-door 600, a vent-door 700, and a defrost door 800 are provided above the heater core 500.

The foot-door 600 is placed on a side face of the case 100 relatively vertical to the ground when in a closed state, and the vent-door 700 and the defrost-door 800 are on the case 100 relatively horizontal to the ground when in a closed state.

Meanwhile, since the temperature-control door 400 has the same function as that of the prior art, depending upon the position of the temperature-control door 400, an air conditioning mode is selected from the cooling mode, the heating mode, and the mixing mode.

The operation of the air conditioning device of the present invention constructed as per the above configuration will now be described.

When a driver operates the air conditioning device so as to perform an air conditioning in a mixing mode, flowing air in both the foot and vent directions 920 and 940 as shown in FIG. 12, the temperature-control door 400 is placed in the mixing mode, and the foot-door 600 and the vent-door 700 are respectively operated.

Here, referring to the operation of the foot-door 600, as the first actuator-connector 676 moves as shown in FIGS. 5 and 11 while the inner and outer doors 610 and 620 are in a closed state as shown in FIG. 8, the first lever 670 rotates about the first center hole 674 for rotation, the first protrusion 672 moves along the first path 679 in the first slot 654 so that the first link 650 rotates the second connector 640, which in turn rotates the outer door 620.

Through the above process, the outer door 620 opens at a certain angle from a closed state so that the lower blade 623 thereof moves from left to right, rising above a horizontal plane, thereby allowing the cool air rising along the first direction 840 and the warm air rising along the second direction 860 to move in the foot direction 920 while being properly mixed together.

Further, as illustrated in FIGS. 5 and 11, when the second actuator-connector 686 rotates about the second center hole 684 for rotation, the second protrusion 664 moves along the second path 689 of FIG. 11 in the second slot 682, so that the second link 660 moves about the second coupling hole 662, rotating the inner door 610.

In FIG. 12, as the inner door 610 rotates clockwise with reference to the outer door 620, a portion of air guided by the outer door 620 and flowing towards the foot direction 920 is guided downwards from the inner door 610 and continues to move towards the foot direction 920, and the remaining portion of the air is guided upwards from the inner door 610 so as to move towards the vent direction 940 along the second direction 860 through the inner space 621.

Thus, according to the present invention, the outer door 620 firstly controls the temperature and amount of air flowing through the outer door towards the foot direction 920, and the inner door 610 secondarily controls the temperature and amount of air flowing through the inner door 610 towards the foot direction 920 more precisely, thereby having an effect of precise control on the temperature and amount of air to flow.

FIG. 13 shows the case in which the air conditioning is performed in the mixing mode while flowing air in both the foot direction 920 and the defrost direction 960.

Here, the temperature-control door 400 is placed in the mixing mode, and the foot-door 600 and the defrost-door 700 are respectively operated.

Here, the operation and effect of the foot-door 600 are the same as those of the case of FIG. 12 where the air conditioning is performed in the mixing mode while flowing air in the both foot and vent directions 920 and 940.

Although a preferred embodiment of the present invention has been described for illustrative purposes, those skilled in the art will appreciate that various modifications, additions and substitutions are possible, without departing from the scope and spirit of the invention. Thus, the disclosed embodiments are provided in order not to restrict but describe the technical spirit of the present invention, so the scope of the present invention is not limited thereto. It should be construed that the scope of the present invention is defined by the accompanying claims and all equivalence within the scope of the invention is included in the accompanying claims.

What is claimed is:

1. An air conditioning device in which the temperature and amount of air flow may be controlled for a car interior comprising:

cooling and evaporator means in fluid communication with a door structure for controlling air flow, said door structure comprising an inner door and an outer door, said outer door having an inner space in which the inner door rotates, and the circumference of which comes into facial contact with the inner door, wherein the facial contact prevents air from leaking, and further wherein the inner and outer doors are configured such that the inner door is adjustably rotated by a second link and a second lever, the second link being provided with a second coupling hole to which a first facetted face is coupled, and the outer door is rotated by a second connector, a first link, and a first lever, the second connector being provided with a fourth semi-circular section into which a circular receptacle of the outer door is inserted, so that the inner and outer doors respectively adjustably rotate thus controlling the amount of air to flow and thereby, the temperature of the car interior.

2. The air conditioning device for a car according to claim 1, wherein the door structure is a foot-door.

3. The air conditioning device for a car according to claim 1, wherein the vertical width of the inner door is larger than the vertical width of the inner space.

4. The air conditioning device for a car according to claim 2, wherein the foot-door is configured such that the inner and outer doors respectively rotate only when air flows in both foot and vent directions or both foot and defrost directions.

5. The air conditioning device for a car according to claim 4, wherein the inner space has an extension space.

6. The air conditioning device for a car according to claim 1, wherein one side of both the inner and outer doors is connected by a first connector, which includes an inner hole defined by a first semi-circular section and an opposite second semi-circular section which is concentric to the first section and is of a size that is larger than that of the first section.

7. The air conditioning device for a car according to claim 1, wherein the inner door is provided with a rotation axis having a circumferential groove, and the outer door is provided with a circular receptacle having a circumferential protrusion fitted into the circumference groove.

8. The air conditioning device for a car according to claim 1, wherein the inner door includes upper and lower blades which are angled at below 180°.

9. The air conditioning device for a car according to claim 6, wherein the inner door is provided with a rotation axis having an end groove, and the inner hole is provided therein with a protrusion, which is inserted into the end groove.

* * * * *